(12) United States Patent
Chen

(10) Patent No.: US 7,039,415 B2
(45) Date of Patent: May 2, 2006

(54) FLEXIBLE SCHEME FOR CONFIGURING "TRAFFIC VOLUME MEASUREMENT REPORTING CRITERIA"

(75) Inventor: Huan-Yueh Chen, Gi-Long (TW)

(73) Assignee: Asustek Computer Inc., Taipei (TW)

( * ) Notice: Subject to any disclaimer, the term of this patent is extended or adjusted under 35 U.S.C. 154(b) by 399 days.

(21) Appl. No.: 10/428,550

(22) Filed: May 2, 2003

(65) Prior Publication Data

US 2003/0207691 A1    Nov. 6, 2003

Related U.S. Application Data

(60) Provisional application No. 60/377,533, filed on May 3, 2002.

(51) Int. Cl.
*H04Q 7/20*    (2006.01)

(52) U.S. Cl. .................. 455/450; 455/452.2; 455/434; 455/453

(58) Field of Classification Search ............... 455/450, 455/452.2, 434, 453
See application file for complete search history.

(56) References Cited

U.S. PATENT DOCUMENTS 6,445,917 B1 *   9/2002   Bark et al. ................... 455/423
6,640,105 B1 *  10/2003   Shin ........................... 455/453

* cited by examiner

*Primary Examiner*—Barry Taylor
(74) *Attorney, Agent, or Firm*—Winston Hsu

(57) ABSTRACT

This invention increases the communication efficiency between the network and the mobile device by eliminating repetitive contents within one communication message in a wireless communication system. Meantime, this invention provides improvements while maintains the existing message data structure intact.

27 Claims, 8 Drawing Sheets

|    | Information Element/Group name | Need | Multi | Type and reference | Semantics description |
|---|---|---|---|---|---|
| 4 | Message Type | MP | | Message Type | |
| | UE information elements | | | | |
| 6 | RRC transaction identifier | MP | | RRC transaction identifier 10.3.3.36 | |
| 8 | Integrity check info | CH | | Integrity check info 10.3.3.16 | |
| | Measurement Information elements | | | | |
| 10 | Measurement Identity | MP | | Measurement Identity 10.3.7.48 | |
| 12 | Measurement Command | MP | | Measurement Command 10.3.7.46 | |
| 14 | Measurement Reporting Mode | OP | | Measurement Reporting Mode 10.3.7.49 | |
| 16 | Additional measurements list | OP | | Additional measurements list 10.3.7.1 | |
| 18 | CHOICE *Measurement type* | CV-*command* | | | |
| | >Intra-frequency measurement | | | Intra-frequency measurement 10.3.7.36 | |
| | >Inter-frequency measurement | | | Inter-frequency measurement 10.3.7.16 | |
| | >Inter-RAT measurement | | | Inter-RAT measurement 10.3.7.27 | |
| | >UE positioning measurement | | | UE positioning measurement 10.3.7.100 | |
| | >Traffic Volume measurement | | | Traffic Volume measurement 10.3.7.68 | |
| | >Quality measurement | | | Quality measurement 10.3.7.56 | |
| | >UE internal measurement | | | UE internal measurement 10.3.7.77 | |
| | Physical channel information elements | | | | |
| | DPCH compressed mode status info | OP | | DPCH compressed mode status info 10.3.6.34 | |

| Condition | Explanation |
|---|---|
| *Command* | The IE is mandatory present if the IE "Measurement command" is set to "Setup", optional if the IE "Measurement command" is set to "modify", otherwise the IE is not needed. |

Figure 1A (Prior Art)

|   | Information Element/Group name | Need | Multi | Type and reference | Semantics description |
|---|---|---|---|---|---|
| 32 | Traffic volume measurement Object | OP | | Traffic volume measurement Object 10.3.7.70 | |
| 34 | Traffic volume measurement quantity | OP | | Traffic volume measurement quantity 10.3.7.71 | |
| 36 | Traffic volume reporting quantity | OP | | Traffic volume reporting quantity 10.3.7.74 | |
| 38 | Measurement validity | OP | | Measurement validity 10.3.7.51 | |
| 40 | CHOICE *report criteria* | MP | | | |
| | >Traffic volume measurement reporting criteria | | | Traffic volume measurement reporting criteria 10.3.7.72 | |
| | >Periodical reporting criteria | | | Periodical reporting criteria 10.3.7.53 | |
| | >No reporting | | | | (no data) Chosen when this measurement only is used as additional measurement to another measurement |

| Condition | Explanation |
|---|---|
| *UL-DCH/USCH* | If IE "Uplink transport channel type" is equal to "DCH" or "USCH" (TDD only) this IE is mandatory present. Otherwise the IE is not needed. |

Figure 1 B ( Prior Art )

| | Information Element/Group name | Need | Multi | Type and reference | Semantics description |
|---|---|---|---|---|---|
| 52 | Traffic volume measurement objects | MP | 1 to <max TrCH> | | |
| 54 | >Uplink transport channel type | MP | | Enumerated (DCH,RACHor CPCH,USCH) | USCH is TDD only. CPCH is FDD only. RACHorCPCH is the currently configured default in the uplink. |
| 56 | >UL Target Transport Channel ID | | CV-UL-DCH/ USCH | Transport channel identity 10.3.5.18 | |

Figure 1 C ( Prior Art )

| | Information Element/Group name | Need | Multi | Type and reference | Semantics description |
|---|---|---|---|---|---|
| 62 | Parameters sent for each transport channel | OP | 1 to <max TrCH> | | This IE is always required, need is OP to align with ASN.1 |
| 64 | >Uplink transport channel type | OP | | Enumerated (DCH,RACHor CPCH,USCH) | USCH is TDD only. CPCH is FDD only. RACHorCPCH is the currently configured default in the uplink. |
| 66 | >UL Transport Channel ID | CV-UL-DCH/USCH | | Transport channel identity 10.3.5.18 | |
| 68 | >Parameters required for each Event | OP | 1 to <max Measper Event> | | |
| 70 | >>Traffic volume event identity | MP | | Traffic volume event identity 10.3.7.66 | |
| 72 | >>Reporting Threshold | MP | | Enumerated (8,16,32,64,128,256, 512,1024,2K,3K,4K, 6K,8K,12K,16K, 24K,32K,48K,64K, 96K,128K,192K, 256K,384K,512K, 768K) | Threshold in bytes And N Kbytes = N*1024 bytes |
| 74 | >>Time to trigger | OP | | Time to trigger 10.3.7.64 | Indicates the period of time between the timing of event detection and the timing of sending Measurement Report. Time in ms |
| 76 | >>Pending time after trigger | OP | | Integer (250, 500, 1000, 2000, 4000, 8000, 16000) | Indicates the period of time during which it is forbidden to send any new measurement reports with the same Traffic volume event identity even if the triggering condition is fulfilled. Time in milliseconds |
| 78 | >>Tx interruption after trigger | OP | | Integer (250, 500, 1000, 2000, 4000, 8000, 16000) | Time in milliseconds. Indicates how long the UE shall block DTCH transmissions on the RACH after a measurement report is triggered. |

| Condition | Explanation |
|---|---|
| UL-DCH/USCH | If IE "Uplink transport channel type" is equal to "DCH" or "USCH" (TDD only) this IE is optional. Otherwise the IE is not needed. |

Figure 1 D ( Prior Art )

| | Information Element/Group name | Need | Multi | Type and reference | Semantics description |
|---|---|---|---|---|---|
| 82 | Traffic volume measurement identity | MD | | Measurement identity 10.3.7.48 | The traffic volume measurement identity has default value 4. |
| 84 | Traffic volume measurement objects | OP | | Traffic volume measurement object 10.3.7.70 | |
| 86 | Traffic volume measurement quantity | OP | | Traffic volume measurement quantity 10.3.7.71 | |
| 88 | Traffic volume reporting quantity | OP | | Traffic volume reporting quantity 10.3.7.74 | |
| 90 | Measurement validity | OP | | Measurement validity 10.3.7.51 | |
| 92 | Measurement Reporting Mode | MP | | Measurement Reporting Mode 10.3.7.49 | |
| 94 | CHOICE *reporting criteria* | MP | | | |
| | >Traffic volume measurement reporting criteria | | | Traffic volume measurement reporting criteria 10.3.7.72 | |
| | >Periodical reporting criteria | | | Periodical reporting criteria 10.3.7.53 | |

Figure 1 E ( Prior Art )

FLEXIBLE SCHEME FOR CONFIGURING "TRAFFIC VOLUME MEASUREMENT REPORTING CRITERIA"

CROSS REFERENCE APPLICATION

This application claims priority from U.S. Provisional Patent Application No. 60/377,533 filed on May 3, 2002.

BACKGROUND

This invention relates to a wireless communication system, and more particularly, this invention modifies the communication message for a better system performance.

Besides transmitting data, a wireless communication network also transmits different messages. These messages have pre-defined structure and meanings that carry commands and feedback back and forth between the network and the mobile devices. For example, the network may request the mobile device to perform a measurement either by broadcasting a SYSTEM INFORMATIONM and/or by transmitting a MEASUREMENT CONTROL message to the intended mobile device. FIGS. 1A–1E illustrate the detail structure of several relevant messages. The FIG. 1A illustrates the IE fields of MEASUREMENT CONTROL message 2. The FIG. 1B illustrates the detailed IE fields of IE "Traffic volume measurement" (TVM) 30. The FIG. 1C illustrates the detailed IE fields of IE "Traffic volume measurement object" (TVMO) 50. The FIG. 1D illustrates the detailed IE fields of IE "Traffic volume measurement reporting criteria" (TVMRC) 60. The FIG. 1E illustrates the detailed IE fields of IE "Traffic volume measurement system information" (TVMSI) 80. Refer to FIG. 1A. The MEASUREMENT CONTROL message 2 contains a plurality of Information Element (IE) fields. The IE "measurement identity" 10 contains a reference number used between the network and the mobile device. The "measurement command" 12 may have three different command selections, namely setup, modify and release. The IE "CHOICE measurement type" 18 specifies what measurement the mobile device should conduct. The MEASUREMENT CONTROL message contains additional information depending on the IE "CHOICE measurement type" 18. When the network wants to check the on-going uplink traffic volume of a particular mobile device, the network sends mobile device a MEASUREMENT CONTROL message containing the IE "Traffic Volume Measurement" (TVM) 30, which includes several IE fields, such as the IE "traffic volume measurement object" (TVMO) 32, the IE "traffic volume measurement quantity" (TVMQ) 34, the IE "traffic volume reporting quantity" (TVRQ) 36, the IE "measurement validity" 38, and the IE "CHOICE report criteria" 40. If the network wants to check out the uplink traffic volume of all its connecting mobile devices, it sends a System Information Block (SIB) message to all intended mobile devices. The SIB includes the IE "Traffic volume measurement system information" (TVMSI) 80, which contains 7 IEs fields 82–94, referring to FIG. 1E, such as TVMO, TVMQ, TVRQ, the IE "CHOICE report criteria" and others.

The TVM and the TVMSI have several IE fields in common. The TVMO is one of them. FIG. 1C illustrates the detailed structure of a TVMO that includes 3 IE fields itself, the first field contains at least one TVMO 50, the second field is the IE "uplink transport channel type" 54 and the last field is the IE "UL target support channel ID" 56. Another IE field in common between the TVM and the TVMSI is the IE "Traffic volume measurement reporting criteria" (TVMRC) 60. The detailed IE fields 62–78 structure of a TVMRC 60 is defined in FIG. 1D that includes a plurality of IE fields, such as the IE "Parameter sent for each transport channel" 62, the IE "Uplink transport channel type" 64, the IE "UL transport Channel ID" 66 etc. When the mobile device receives a TVM or a TVMSI, the mobile device shall take actions based on the selection passed in the IE "Choice report criteria" 40 in FIG. 1B and 94 in FIG. 1E. If the IE "Traffic volume measurement reporting criteria" is chosen, the mobile device shall send measurement report when the event-trigger criteria defined in TVMRC is fulfilled. The IE "CHOICE report criteria" indicates when and how the reporting method is requested to perform by the mobile device. If the IE "Periodical reporting criteria" is chosen, the mobile device shall send measurement report periodically per the parameters defined within the IE "Periodical reporting criteria". Currently the network assigns a TVMRC either to each uplink transport channels individually, or to all uplink transport channels indicated in the IE "Traffic Volume Measurement Object" (TVMO).

In brief, FIG. 2 shows how a mobile device in the prior art processes the received MEASUREMENT CONTROL message. Upon receiving a TVM 100, the mobile device shall store the contents of the TVM in a variable 102. Next, the mobile device checks whether the TVMO field of the MEASUREMENT CONTROL is present or not 104, if it does not present, then the mobile device shall apply parameters sent in TVMRC to the mobile device's all uplink transport channels 106. However, if the mobile device received a TVM within the MEASUREMENT CONTROL message, in addition to a TVMO 104, where the message has a "setup" in the IE "measurement command" 108, the receiver shall further check if the IE "traffic volume reporting quantity" is present, then the mobile device generates report according to the measured quantities specified in the IE "traffic volume reporting quantity" 110, 116. If the IE "traffic volume reporting quantity" is not included in the message, then the mobile device shall clear all stored measurement control information associated to this measurement identity and set flag for configuration incomplete to be TRUE 112 and 114. Meantime, if the parameter "Average of RLC Buffer Payload for each RB" or the parameter "variance of RLC Buffer for each RB" is set 118, while the IE TVMQ is not included 120, or the IE TVMQ is included but the parameter "time interval to take an average or a variance" is not included 120 and 124, then the mobile device sets the flag for configuration incomplete to TRUE 122. Otherwise, if the "time interval to take an average or a variance" parameter is included, the mobile device uses the time specified in the time interval parameter to calculate the average and/or variance of RLC Buffer Payload according to the TVRQ IE field 124 and 126.

On the other hand, FIG. 3 illustrates how the prior art process a Measurement Control with a TVMRC 130, if the IE "parameters sent for each transport channel" of the TCMRC is absent, then the mobile device shall report such error 134 and 136. Otherwise, the mobile device stores the TVMRC to a variable MEASUREMENT_IDENTITY 138. If the IE "UL transport channel ID" is not included in the TVMRC 140, the mobile device shall apply the parameters sent in TVMRC to the mobile device's all uplink transport channels indicated in the TVMO IE field 142. If the network does not specified a TVMO for a given measurement identity, then the mobile device shall apply the parameters sent in TVMRC to all uplink transport channels that are configured for the current mobile device state 144, 146. If the IE "Tx interruption after trigger" is included 148, the mobile device shall block DTCH transmission on the random access channel (RACH) during the time specified in the IE after a measurement report is transmitted 150.

According to the prior art, if the network sends a MEASUREMENT CONTROL message to ask the mobile device to perform uplink traffic volume measurement on the dedicated channel (DCH) transport channels and a RACH, and if the network would like to assign the same reporting criteria to all the DCH transport channels and a different reporting criteria to RACH. Then the network, in the TVMRC of the message, assign the same reporting criteria to each DCH transport channels individually and a different reporting criteria to RACH. It must send the same IE "Parameters required for each Event" for each DCH transport channels and a different IE "Parameters required for each Event" for RACH. For instance, when the network assigns the same event 4A (Transport Channel Traffic Volume exceeds an absolute threshold) to all DCH 1~4 transport channels and event 4B (Transport Channel Traffic Volume becomes smaller than an absolute threshold) to RACH, it must send a message that includes a information structure like [DCH 1+parameters required for event 4A, DCH 2+parameters required for event 4A, DCH 3+parameters required for event 4A, DCH 4+parameters required for event 4A, RACH+parameters required for event 4B]. In this case, apparently the system wastes valuable channel resources to transmit redundant parameters over the air. Under the current design, the parameters sent for event 4A for DCH 1~4 channels are all the same. By transmitting the same redundant information four times in a message wastes the valuable system resources.

SUMMARY

This invention improves the communication efficiency of the wireless communication system while keeps the current message data structure intact.

BRIEF DESCRIPTION OF THE DRAWINGS

Following drawings with reference numbers and exemplary embodiments are referenced for explanation purpose.

FIGS. 1A–1E illustrate the detailed IE fields of MEASUREMENT CONTROL message;

DETAILED DESCRIPTION OF THE INVENTION

Using the same basic structure of a MEASUREMENT CONTROL message in the network, by consolidating repetitive information, or by eliminating the redundancy of parameters inside of the message, or by modifying command interpretations, this invention increases system efficiency. Of course, the network still can assign each individual channel with its corresponding parameter(s) (i.e. IE "Parameters required for each Event") by loading the selected channel type, channel ID and its corresponding event parameters into the message then transmits the message to the mobile device as the prior art does. In addition, whenever, the network wants to send the same parameter(s) to all the rest of unassigned uplink transport channels of the same channel type of an intended mobile device or all connected mobile devices, the network assigns a "DCH" or a "USCH" value to the IE "Uplink transport channel type" and not includes the IE "UL transport channel ID". At the same time, the network will load just one set of parameter(s) into the message, which is different from the prior art of loading multi-copies the same parameters into the same message. Moreover, in the case that not all mobile device channels use the same parameters, but two or more channels share the same parameters. First, the network can assign the channel(s) with unique corresponding parameters as the prior art does by loading each uplink transport channel with one copy of its corresponding parameter(s) into the message. Second, for the channels sharing the same parameter(s), the network can omit the channel ID and/or channel type while loads only one set of corresponding parameters in the same message. Therefore, in this invention the network can send message without redundant parameters.

Figure 2:
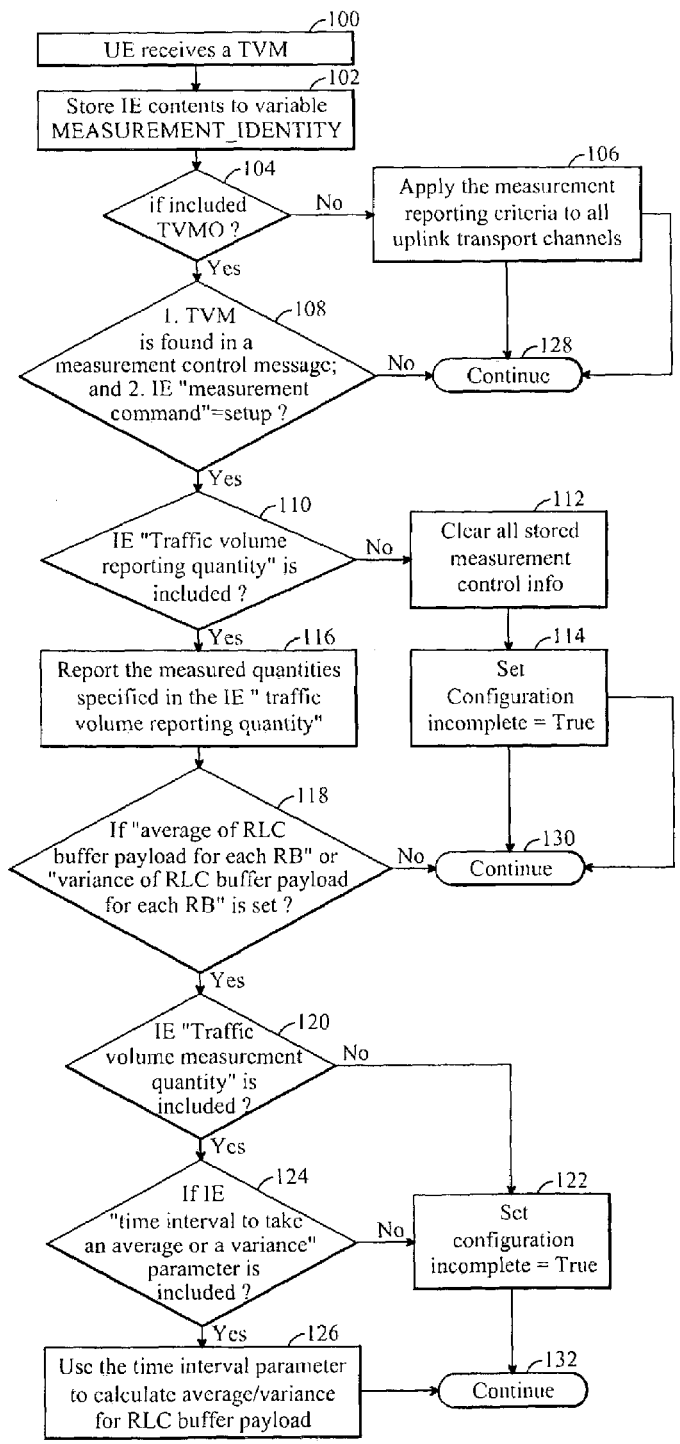
FIG. 2 illustrates the brief logical flowchart of how the mobile device processes a MEASUREMENT CONTROL message which includes the IE "Traffic Volume Measurement"
Figure 3:
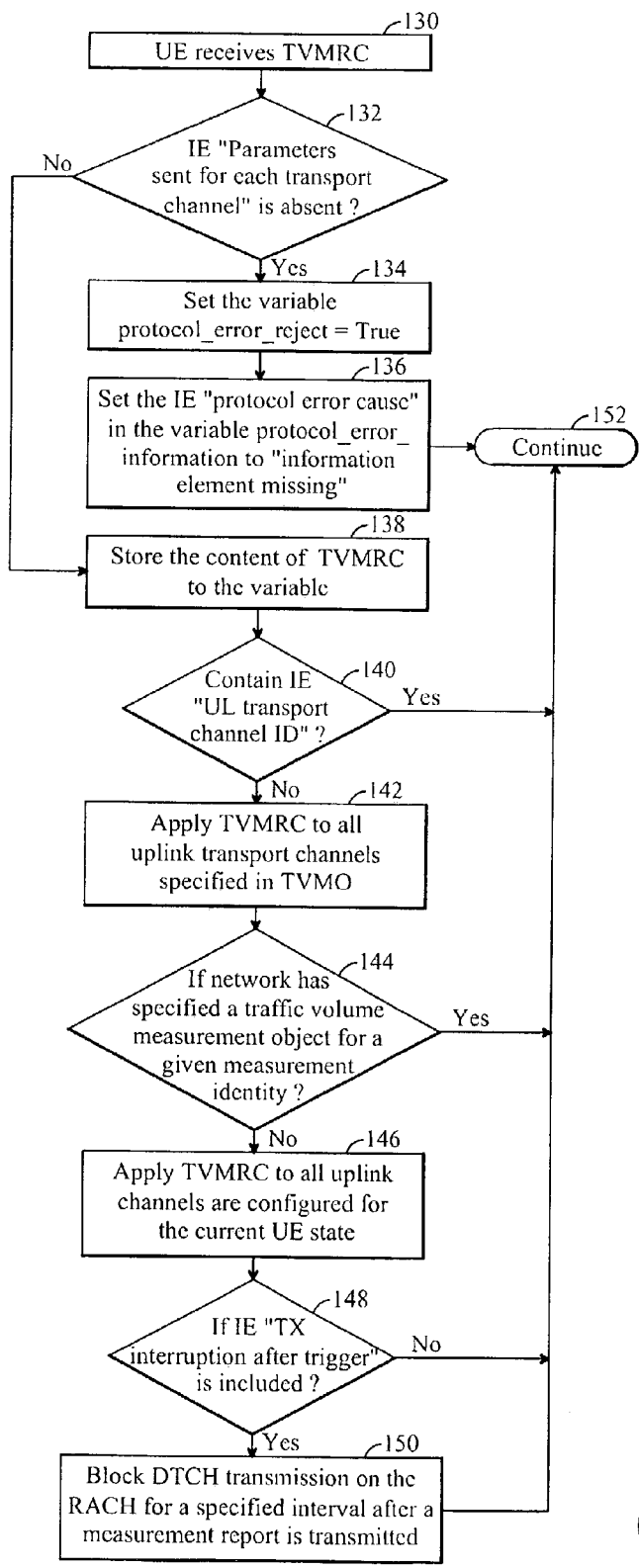
FIG. 3 illustrates the brief logical flowchart of how the mobile device processes a TVMRC.
Figure 4:
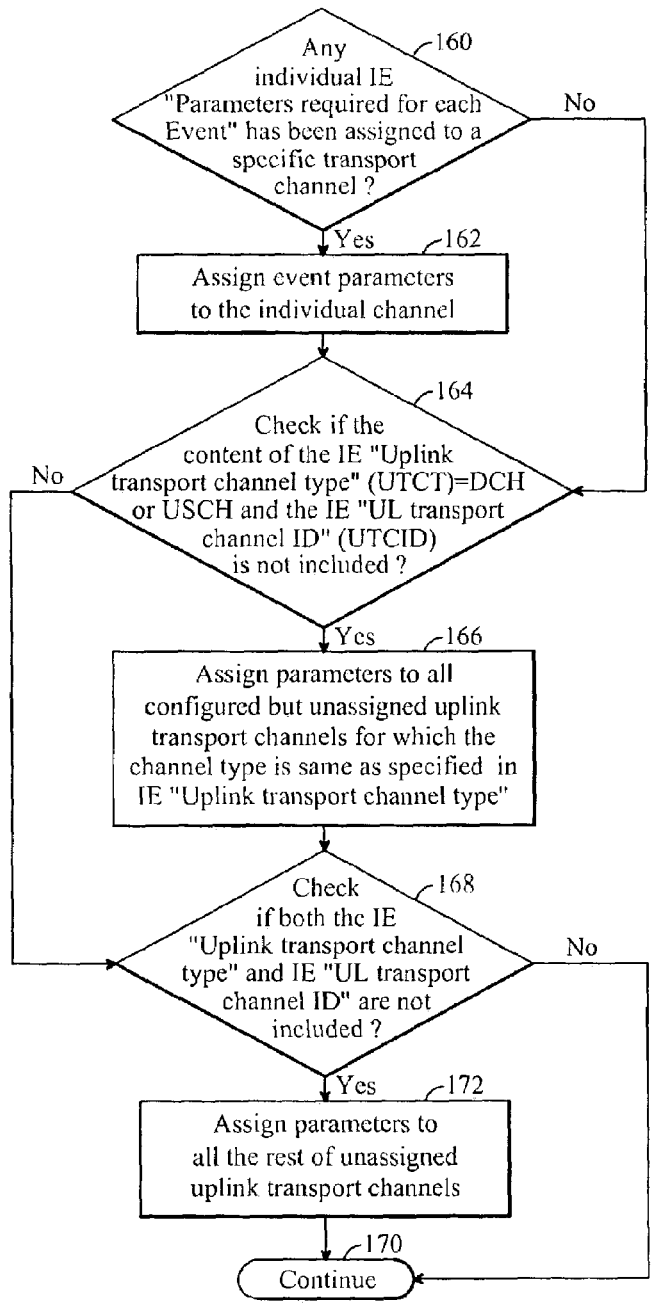
FIG. 4 illustrates the brief logical flowchart of how the mobile device implemented with this invention processes a MEASUREMENT CONTROL message.

Next, at the mobile device side, refer to FIG. 4, once the mobile device receives a message, it checks the IE "Uplink transport channel type" and the IE "UL transport channel ID" of the message first. The mobile device checks if there is any event parameter(s) individually assigned for a particular channel 160, if it does (i.e. both the IE "Uplink transport channel type" and the IE "UL transport channel ID" are included in same message to specify this particular channel), the mobile device assigns the parameter(s) to the individual channel 162. Then, the mobile device checks if the IE "Uplink transport channel type" has a specified value as "DCH" or "USCH" and the IE "UL transport channel ID" is not included 164, if both conditions are true, then the mobile device will automatically assign the channel parameters to all its existing uplink transport channels which have the same channel type specified in IE "Uplink Transport Channel Type" 166. Next, if there are event parameters included in the same message while there is no assignment to the IE "Uplink transport channel type" nor the IE "UL transport channel ID" 168, then the mobile device assigns the particular channel parameters to all yet unassigned transport channels 172, irrespective of the channel type. The invention reduces the contents, eventually the size, of such message to be transmitted.

Using the previous example while the network sends the same parameters for event 4A to DCH 1–4 transport channels and event 4B to RACH, a network implemented with this invention, instead of sending the same parameters required for event 4A four times for DCH 1–4 four channels, the network will assign one copy of the IE "Parameters required for each Event" to all uplink DCH transport channels of the intended mobile device(s) by setting the IE "Uplink transport channel type" to "DCH" and not including the IE "UL Transport Channel ID". Compare to the current prior art design, the new network will not need to put four individual IE "UL Transport Channel ID" nor four copies of the same parameter(s) of DCH 1–4 within a message in this case. The modified network sends a new message such as [DCH+parameters required for event 4A, RACH+parameters required for event 4B]. When a mobile device receives the message, the mobile device will apply the same parameter(s) required for the event 4A to all uplink transport channels that the "Uplink transport channel type" is "DCH", which are DCH 1–4 channels in this case. The system trims at least three sets of redundant parameters from the content of an old message, therefore, saves network resources.

For another example, if the network would like to assign event 4A to DCH 1, event 4B to RACH and same events 4A&4B to DCH 2–4, with this invention the network could send a new message with contents such as [DCH 1+parameters required for event 4A, RACH + parameters required for event 4B, DCH+parameters required for event 4A&4B]. The new modified mobile device receives this message, it will assign all unassigned DCH channels, which are DCH channels 2–4 automatically to the parameters required for event 4A&4B. In this particular example, this invention trims at least two redundant parameters required for event 4A&4B from the content of the new message.

In addition, when IE "Uplink transport channel type" and "UL Transport Channel ID" both are absent from the message, the mobile device implemented with this invention will automatically assign the attached IE "Parameters required for each Event" to all the rest of unassigned uplink transport channels, irrespective of the channel type. For example, if the network assigns event 4A to DCH 1, event 4B to DCH 2 and same events 4A&4B to DCH 3, 4 and USCH 1, it could send a message with the new structure as [DCH 1+parameters required for event 4A, DCH 2+parameters required for event 4B, IE "Uplink transport channel type" and "UL Transport Channel ID" are absent + parameters required for event 4A&4B]. By comparison, the old message has the contents of [DCH 1+parameters required for event 4A, DCH 2+parameters required for event 4B, DCH 3 parameters required for event 4A&4B, DCH 4+parameters required for event 4A&4B, USCH 1+parameters required for event 4A&4B]. The new message is smaller than the old message, therefore, the network saves the system resources.

The above inventions provide a flexible scheme for configuring the IE TVMRC without changing the current message structure, i.e. based on the current defined message. And with these modifications, the network could reduce the unnecessary message size since it could configure the IE "Traffic volume measurement reporting criteria" to the mobile device with a more flexible way.

What is claimed is:

1. A method for increasing the channel communication efficiency between the network and the mobile device in a wireless communication system; wherein the network sending measurement request to the mobile device through a message containing at least one measurement related command, the channel type field(s), the channel ID field(s), and the event parameter field(s), the method comprising the steps of:
    at the network:
    loading the command(s), an individual channel ID in the designated channel ID filed, a channel type value in the channel type field and a copy of its corresponding event parameter(s) into the message if no other channels in this intended mobile device sharing the same event parameter(s);
    loading the command(s), a predefined value in the designated channel type field not indicating specific channel IDs, no channel ID into the channel ID field and one copy of the corresponding event parameter(s) into the message if the same event parameter(s) is assigned to all unassigned channels of the same channel type; and
    loading the command(s), one copy of the corresponding event parameter(s) without any corresponding channel ID in the channel ID field and without any channel type in the channel type field if the same event parameter(s) is assigned to all unassigned channels, irrespective of the channel type.

2. The method as claimed in claim 1, wherein the message is a Measurement Control message.

3. The method as claimed in claim 2, wherein a predefined value is a "DCH" or a "USCH", while the designated channel ID filed is the "Uplink transport channel ID" field.

4. The method as claimed in claim 2, wherein a predefined value is a "DCH" or a "USCH", while the designated channel type filed is the "UL transport channel type" field.

5. The method as claimed in claim 2, wherein a predefined value is a "DCH" or a "USCH", while the corresponding event parameter field(s) is the "Parameters required for each Event".

6. The method as claimed in claim 1, wherein the message is a System Information message.

7. The method as claimed in claim 6, wherein a predefined value is a "DCH" or a "USCH", while the designated channel ID filed is the "Uplink transport channel ID" field.

8. The method as claimed in claim 6, wherein a predefined value is a "DCH" or a "USCH", while the designated channel type filed is the "UL transport channel type" field.

9. The method as claimed in claim 6, wherein a predefined value is a "DCH" or a "USCH", while the corresponding event parameter field(s) is the "Parameters required for each Event".

10. A method for increasing the channel communication efficiency between the network and the mobile device in a wireless communication system; wherein the network sending measurement request to the mobile device through a message containing at least one measurement related command, the channel ID field(s), the channel type field(s) and the event related parameter field(s), wherein the method comprising the steps of:
    at the mobile device:
    receiving the message sent by the network;
    extracting the command(s), the corresponding channel type from the channel type field, the corresponding channel ID from the channel ID field and its corresponding event parameter(s) from the received message;
    assigning the corresponding event parameters to the designed channel according to the selected channel type and channel ID if the selected channel is an individual channel;
    assigning the corresponding event parameter(s) to all the rest of unassigned channels of the same channel type, except the previous one described assigning of the mobile device by the same message, if the selected channel type is equal to a predefined value that does not indicate specific channel IDs and there is no corresponding channel ID assigned; and
    assigning the corresponding event parameter(s) to all the rest of unassigned channels, irrespective of the channel type, except the previous two described assigning of the mobile device by the same message, if no corresponding channel ID and channel type assigned.

11. The method as claimed in claim 10; wherein the message is a "Measurement Control" message.

12. The method as claimed in claim 11; wherein the selected channel type is equal to a predefined value is either a "DCH" or a "USCH", while the designated channel ID filed is the "Uplink transport channel ID" field.

13. The method as claimed in claim 11, wherein the selected channel type is equal to a predefined value is either a "DCH" or a "USCH", while the designated channel type filed is the "Uplink transport channel type" field.

14. The method as claimed in claim 11, wherein the selected channel type is equal to a predefined value is either a "DCH" or a "USCH", while the corresponding event parameter field(s) is the "Parameters required for each Event".

15. The method as claimed in claim 10; wherein the message is a System Information message.

16. The method as claimed in claim 15; wherein the selected channel type is equal to a predefined value is either a "DCH" or a "USCH", while the designated channel ID filed is the "Uplink transport channel ID" field.

17. The method as claimed in claim 15, wherein the selected channel type is equal to a predefined value is either a "DCH" or a "USCH", while the designated channel type filed is the "Uplink transport channel type" field.

18. The method as claimed in claim 15, wherein the selected channel type is equal to a predefined value is either a "DCH" or a "USCH", while the corresponding event parameter field(s) is the "Parameters required for each Event".

19. A mobile device for increasing the channel communication efficiency between the network and the mobile device in a wireless communication system; wherein the network sending a message to the mobile device containing at least one measurement related command, the channel ID field(s), the channel type field(s) and the event related parameter(s), wherein the mobile device comprising:
   means for receiving the message sent by the network;
   means for extracting the command(s), the corresponding channel ID from the channel ID field, the corresponding channel type from the channel type field and the corresponding event parameter(s) from the received message;
   means for assigning the corresponding event parameter(s) to the channel according to the selected channel type and channel ID if the channel is an individual channel;
   means for assigning the corresponding event parameter(s) to all the rest of unassigned channels of the same channel type, except previous one described means of the mobile device by the same message, if the selected channel type is equal to a predefined value that does not indicate specific channel IDs and there is no corresponding channel ID assigned; and
   means for assigning the corresponding event parameter(s) to all the rest of unassigned channels, irrespective of the channel type, except previous two described means of the mobile device by the same message, if there is no corresponding channel ID and channel type assigned.

20. The mobile device as claimed in claim 19, wherein the message is a Measurement Control message.

21. The mobile device as claimed in claim 20, wherein a predefined value is a "DCH" or a "USCH", while the designated channel ID filed is the "Uplink transport channel ID" field.

22. The mobile device as claimed in claim 20, wherein a predefined value is a "DCH" or a "USCH", while the designated channel type filed is the "UL transport channel type" field.

23. The mobile device as claimed in claim 20, wherein a predefined value is a "DCH" or a "USCH", while the corresponding event parameter field(s) is the "Parameters required for each Event".

24. The mobile device as claimed in claim 19, wherein the message is a System Information message.

25. The mobile device as claimed in claim 24, wherein a predefined value is a "DCH" or a "USCH", while the designated channel ID filed is the "Uplink transport channel ID" field.

26. The mobile device as claimed in claim 24, wherein a predefined value is a "DCH" or a "USCH", while the designated channel TYPE filed is the "UL transport channel type" field.

27. The mobile device as claimed in claim 24, wherein a predefined value is a "DCH" or a "USCH", while the corresponding event parameter field(s) is the "Parameters required for each Event".

* * * * *